United States Patent
Schreter (10) Patent No.: US 9,442,948 B2
(45) Date of Patent: Sep. 13, 2016

(54) RESOURCE-SPECIFIC CONTROL BLOCKS FOR DATABASE CACHE

(75) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 965 days.

(21) Appl. No.: 13/160,697

(22) Filed: Jun. 15, 2011

(65) Prior Publication Data

US 2012/0323874 A1 Dec. 20, 2012

(51) Int. Cl.
*G06F 17/30* (2006.01)

(52) U.S. Cl.
CPC .............................. *G06F 17/30132* (2013.01)

(58) Field of Classification Search
CPC .................................................. G06F 17/3048
USPC ......................................................... 707/781
See application file for complete search history.

(56) References Cited

U.S. PATENT DOCUMENTS

| | | | | |
|---|---|---|---|---|
| 5,369,757 A | * | 11/1994 | Spiro | G06F 11/1471 714/19 |
| 2005/0071571 A1 | * | 3/2005 | Luick | G06F 12/0862 711/137 |
| 2006/0168585 A1 | * | 7/2006 | Grcevski | G06F 9/526 718/104 |
| 2006/0230085 A1 | * | 10/2006 | Strahl et al. | 707/205 |
| 2006/0235909 A1 | * | 10/2006 | Oks | G06F 11/1471 |
| 2007/0299904 A1 | * | 12/2007 | Springer et al. | 709/200 |
| 2008/0183657 A1 | * | 7/2008 | Chang et al. | 707/2 |
| 2010/0235580 A1 | * | 9/2010 | Bouvier | 711/129 |
| 2010/0299499 A1 | * | 11/2010 | Golla et al. | 712/206 |
| 2011/0179015 A1 | * | 7/2011 | Balebail | 707/720 |
| 2012/0226668 A1 | * | 9/2012 | Dhamankar | G06F 17/30303 707/690 |

OTHER PUBLICATIONS

Karedla et al. ("Caching Strategies to Improve Disk System Performance", IEEE, Mar. 1994).*
Goetz Graefe. 2007. Efficient columnar storage in B-trees. SIGMOD Rec. 36, 1 (Mar. 2007).*

* cited by examiner

*Primary Examiner* — Syed Hasan
(74) *Attorney, Agent, or Firm* — Buckley, Maschoff & Talwalkar LLC (57) ABSTRACT

A system includes reception of an instruction to load a page from a database datastore into a database cache, allocation of the page within the cache, determination of a resource type associated with the page, and allocation of a control block for the page within the cache based on the determined resource type, wherein the allocated control block in a case that the resource type is a first resource type is different from the allocated control block in a case that the resource type is a second resource type.

36 Claims, 5 Drawing Sheets

RESOURCE-SPECIFIC CONTROL BLOCKS FOR DATABASE CACHE

FIELD

Some embodiments relate to database systems. In particular, some embodiments concern control blocks for cached pages of a database system.

BACKGROUND

A conventional database system uses a datastore to persistently store data pages, and a cache to provide fast access to the data pages. For example, in response to a request to access a data page, the data page is loaded from the datastore into the cache, and may thereafter be accessed from and/or modified within the cache. At specified times (e.g., when the data stored in the cache reaches a particular percentage of the total cache capacity, when a savepoint is initiated, etc.), modified data pages from the cache are written back to the datastore.

A "shadow paging" system may be employed, in which the original unmodified data page remains designated as a "last known good" page in the datastore and the modified data page is written to a new location in the datastore. The datastore also includes converter pages, which map the logical page number of a data page to the location of the datastore at which the "last known good" data page is stored. The converter pages are also loaded into the cache, and are modified within the cache once a modified data page is saved to a new location of the datastore. The modified converter pages are written to the datastore at the end of a savepoint, after all modified data pages are written, and are written to locations which are different from the locations of the last version of the converter pages.

When a data page or a converter page is created in the cache, a control block for the page is also allocated within the cache. The control block may include various information used for cache management, such as the page number of the page, a read/write lock for the contents of the page, a flag indicating whether or not the page has been modified from its "last known good" version, Least Recently Used (LRU) information used to implement page replacement policies for freeing cache space, etc.

Optimizations have been developed for managing different types of pages (e.g., converter, data) within a database cache. Conventional page control blocks do not provide the data structures required to implement these optimizations. Accordingly, these data structures must be separately allocated and managed.

DETAILED DESCRIPTION

Figure 1:
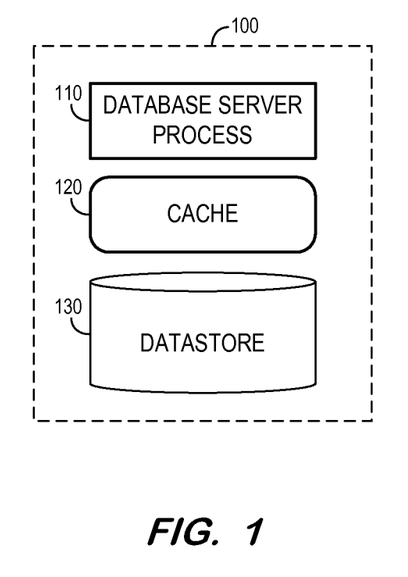
FIG. 1 is a block diagram of a database according to some embodiments.

FIG. 1 is a block diagram of database system 100 according to some embodiments. Database system 100 includes database server process 110, cache 120 and datastore 130.

Database server process 110 may comprise and/or may be implemented by computer-executable program code. For example, database system 100 may comprise one or more hardware devices, including at least one processor to execute program code so as to cause the one or more hardware devices to provide database server process 110.

Cache 120 may be implemented in Random Access Memory (RAM), and datastore 130 may comprise one or more fixed disks. Alternatively, database system 100 may comprise an "in-memory" database, in which both the data of datastore 130 and cache 120 are stored in volatile (e.g., non-disk-based) memory (e.g., RAM). In some embodiments, the data may comprise one or more of conventional tabular data, row-based data, columnar data, and object data. Database system 100 may also or alternatively support multi-tenancy by providing multiple logical database systems which are programmatically isolated from one another.

Database system 100 may communicate with one or more database applications (not shown) over one or more interfaces (e.g., a Structured Query Language (SQL)-based interface). The database applications may provide, for example, business reporting, inventory control, online shopping, and/ or any other suitable functions. The database applications may, in turn, support client applications that may be executed by client devices. Such a client application may simply comprise a Web browser to access and display reports generated by a database application.

The data of database system 100 may be received from disparate hardware and software systems, some of which are not interoperational with one another. The systems may comprise a back-end data environment employed in a business or industrial context. The data may be pushed to database system 100 and/or provided in response to queries received therefrom.

Database system 100 and each element thereof may also include other unshown elements that may be used during operation thereof, such as any suitable program code, scripts, or other functional data that is executable to interface with other elements, other applications, other data files, operating system files, and device drivers. These elements are known to those in the art, and are therefore not described in detail herein.

Although embodiments are described with respect to database system 100, which is a "single node" database system, embodiments may also be implemented within one or more nodes of a distributed database, each of which comprises an executing process, a cache and a datastore. The data stored in the datastores of each node, taken together, represent the full database, and the database server processes of each node operate to transparently provide the data of the full database to the aforementioned database applications.

Figure 2:
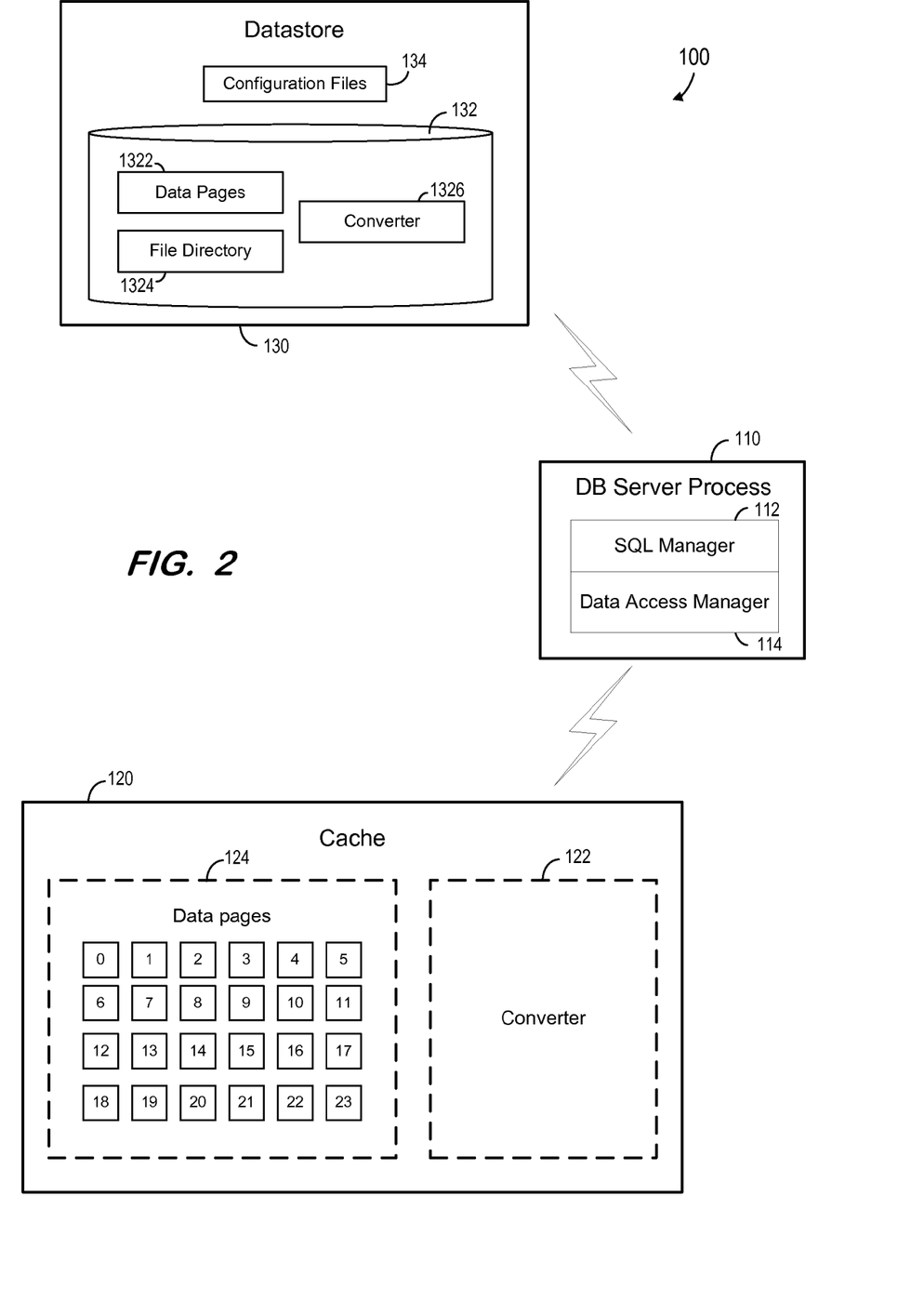
FIG. 2 is a detailed block diagram of a database according to some embodiments.

FIG. 2 is a block diagram of database system 100 according to some embodiments. For purposes of the foregoing description, it will be assumed that datastore 130 comprises only data volume 132. Datastore 130 may comprise one or more data volumes in some embodiments, with each of the one or more data volumes comprising one or more disparate physical systems for storing data. These physical systems may comprise a portion of a physical hard disk, an entire physical hard disk, a storage system composed of several physical hard disks, and/or RAM.

Generally, a data volume is subdivided into storage areas known as blocks, and data is stored in the data volume in data pages 1322, each of which has the same size as a block. Accordingly, a particular data page 1322 of datastore 130 may be accessed by referencing the data volume and block address associated with that data page. Data pages 1322 may include application data consisting of tabular data, row-based data, columnar data, object data and associated index entries. In a case that datastore 130 includes more than one data volume, data pages 1322 may be spread across one or more of its data volumes.

Data volume 132 includes file directory 1324 and converter 1326. If datastore 130 includes more than one data volume, file directory 1324 and converter 1326 may be spread across one or more of the data volumes. When a new data page is created, the data page is assigned a unique logical page number. Converter 1326 maps this logical page number to the data volume and block address at which the data page is stored. File directory 1324 maps a file identifier to a logical page number of a corresponding file root page, and the aforementioned database catalog maps each file identifier to associated metadata, including a name of a database object associated with the file identifier. Accordingly, the information of the database catalog and file directory 1324 may be used to determine a logical page number from a name of a database object, for example.

The foregoing process also applies to "in-memory" implementations. However, an identifier of a data volume in which a page is stored might not be utilized in such implementations, as the in-memory datastore might simply comprise addressable memory locations which are not divided into logical data volumes.

Datastore 130 may also include configuration files 134 defining properties of database system 110 (e.g., a size and physical location of each data volume, a maximum number of data volumes in datastore 130, etc.). Moreover, datastore 130 typically includes system files, database parameters, paths, user information and any other suitable information. Datastore 130 may also store a database catalog including metadata describing the database objects that are stored therein.

DB server process 110 may comprise any system for managing a database system that is or becomes known. Generally, DB server process 110 may receive requests for data (e.g., SQL requests from a database application), may retrieve the requested data from datastore 130 or from cache 120, and may return the requested data to the requestor. In some embodiments, DB server process 110 includes SQL manager 112 to process received SQL statements and data access manager 114 to manage access to stored data. DB server process 110 may also perform start-up, logging, recovery, management, optimization, monitoring, indexing, integrity checks and other database-related tasks.

Cache 120 stores various elements of datastore 130 during execution of database system 100. These elements may include recently-accessed ones of data pages 1322, pages of converter 1326, and/or a log queue. As shown, cache 120 includes converter 122 and data pages 124. Converter 122 and data pages 124 are illustrated separately herein for the sake of clarity. However, according to some embodiments, converter 122 and data pages 124 might not comprise separate, contiguous memory addresses of cache 120. For example, pages of converter 122 may be interspersed among data pages 124 throughout cache 120.

The pages of converter 1326 are created in cache 120 as converter 122 in order to provide fast access to data pages 1322. In this regard, a database transaction may require access to a database object stored in data pages 1322. A file identifier corresponding to the database object is determined based on the database catalog, and a logical page number of a root page of the database object is determined from the file identifier using file directory 1324. Next, converter 122 is traversed to determine a block address of data volume 132 at which the root page is stored, based on the logical page number.

Figure 3:
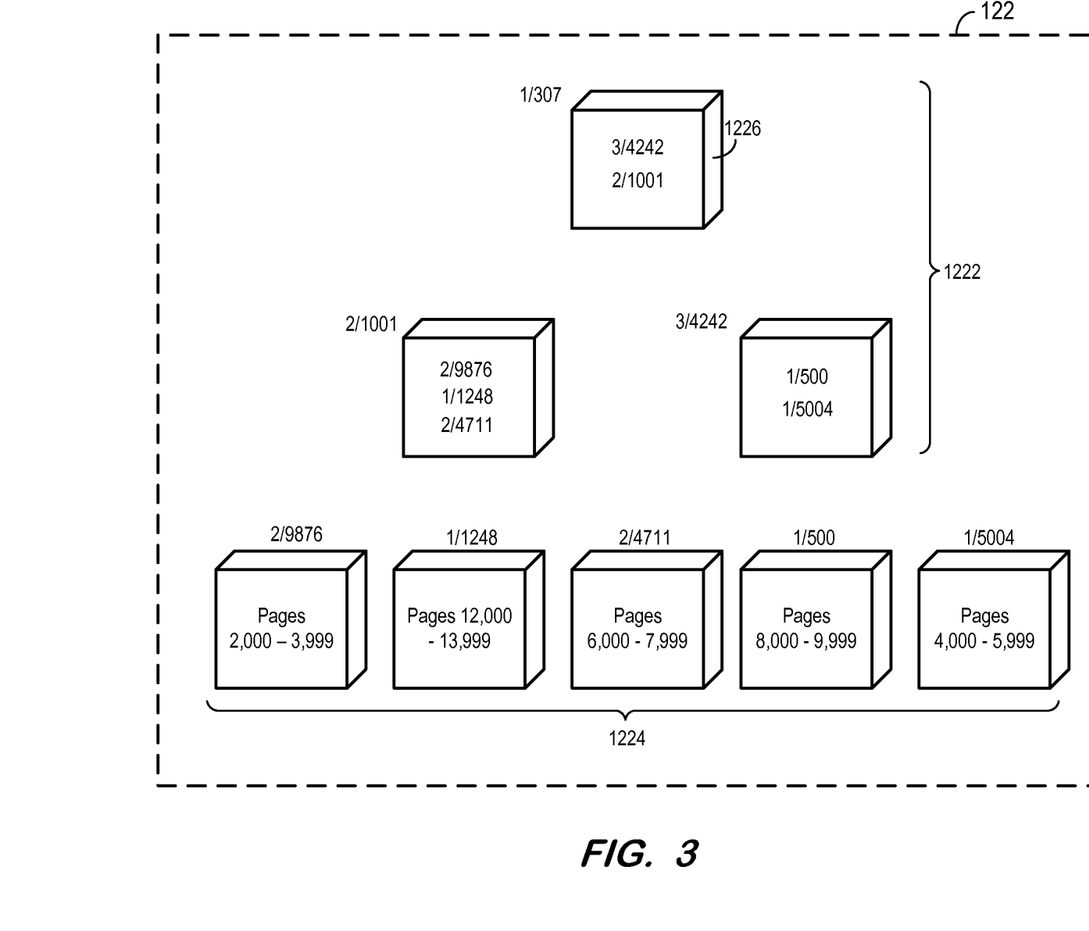
FIG. 3 illustrates a converter stored in a datastore according to some embodiments.

FIG. 3 illustrates converter 122 of cache 120 according to some embodiments, which includes converter inner pages 1222 and converter leaf pages 1224. Locations at which converter inner pages 1222 and converter leaf pages 1224 are stored are identified using the convention "volume number/block address", and FIG. 3 thereby indicates that datastore 130 consists of at least three data volumes. As mentioned above, embodiments are not limited to databases having more than one data volume.

Each inner page 1222 specifies block addresses of one or more child converter pages, which may comprise one or more inner pages 1222 or one or more leaf pages 1224. A converter leaf page 1224 provides the storage locations of data pages corresponding to each logical page number associated with the leaf page 1224. These storage locations are where the "last known good" versions of these data pages are stored in data store 130.

Inner pages 1222 may be used to locate a leaf page 1224 corresponding to a particular logical page number and to locate a data page in data volume 132 based on the located leaf page 1224. By virtue of this arrangement, any pages of converter 122 (and any associated data pages) may be located in datastore 130 based only on the block address of converter root page 1226.

Cache 120 also stores pages from data volume 132 that have been recently read or write-accessed. If a database transaction requires modification of a data page, the data page is read from a block address of data volume 132 using converter 122 as described above and is created within data pages 124 of cache 120 (unless the data page is already among data pages 124 of cache 120), the data page is modified within cache 120, and a log entry describing the modification is recorded. The modified page remains in cache 120, the modified page is designated as modified using a control block associated with the created page, and the original "last known good" page remains at the block address of data volume 132 from which it was read.

Once the number of modified pages in cache 120 reaches a threshold amount, or after passage of a designated time interval, all pages of cache 120 which are designated as modified are written to data volume 132. As described in the above Background, a modified page is not written to the block address of data volume 132 from which it was initially read. Rather, the original unmodified page remains designated as a "last known good" page at its block address and the modified page is written to a new block address of data volume 132.

Since converter 1326 of data volume 132 maps logical page numbers to block addresses of data volume 132, converter 1326 must be modified once a corresponding data page is saved to a new location of data volume 132. The modified converter pages are flushed to data volume 132 at the end of a savepoint, particularly after all modified data pages are written to data volume 132. Then, a restart record is created to point to the starting point of the newly-saved converter within data volume 132. The restart record may be stored in any volume of datastore 130.

The foregoing operation, and other database operations not described herein, require the creation of pages within a database cache. Generally, these created pages may consist of data pages and converter pages. Each data page may be associated with a resource type such as, but not limited to, "row-based", "columnar", and "object". The resource type of a data page may refer to the type of data stored within the data page. For example, a data page of the "columnar" resource type may store the entries of table columns in contiguous linear memory locations, while a data page of the "row-based" resource type may store the fields of each tabular row in contiguous linear memory locations.

Each converter page may be associated with a resource type such as, but not limited to, "inner" and "leaf". A converter page of the "inner" resource type corresponds to converter pages which simply point to other converter pages, while a converter page of the "leaf" resource type corresponds to converter pages which include mappings of logical page numbers to storage locations.

When a page is created in the cache, a respective control block for the page is also allocated within the cache. The control block may include a plurality of members, including but not limited to members to specify a logical page number of the page, a read/write lock for the contents of the page, an I/O lock, an in-memory lock flag, a callback and callback context, a "modified" flag, Least Recently Used (LRU) information used to implement page replacement policies for freeing cache space, etc.

Figure 4:
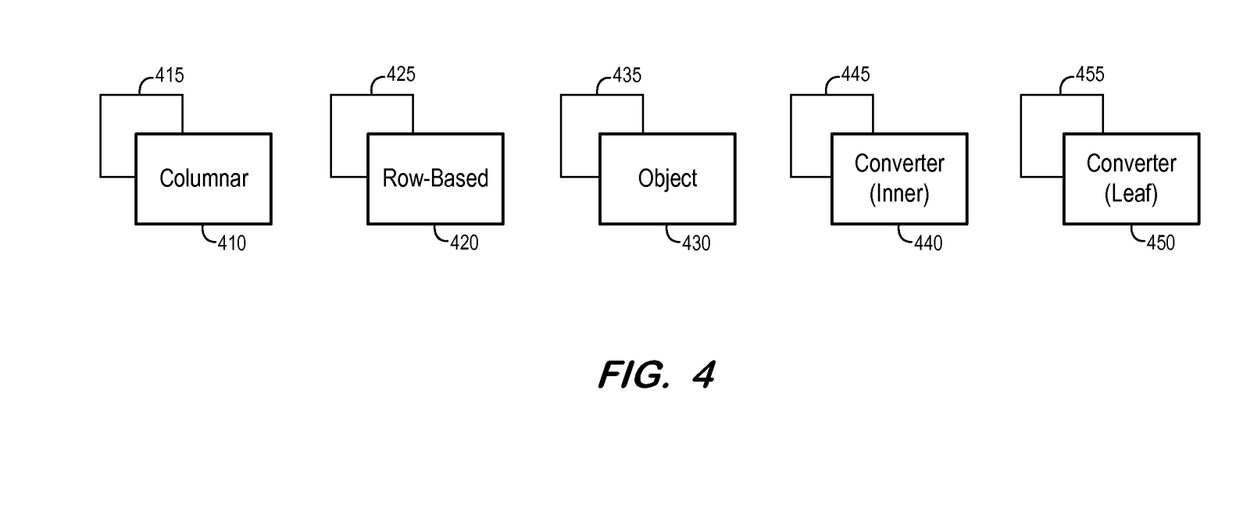
FIG. 4 illustrates pages associated with various resource types and their respective control blocks within a database cache.

FIG. 4 illustrates pages 410, 420, 430, 440 and 450 of a cache and their respective control blocks 415, 425, 435, 445 and 455. Advantageously, control blocks 415, 425, 435, 445 and 455 are allocated such that the members of each of control block are not identical to one another. For example, at least one of control blocks 415, 425, 435, 445 and 455 may include a plurality of members that is different from the plurality of members included within the other ones of control blocks 415, 425, 435, 445 and 455. Moreover, these differences may cause at least one of control blocks 415, 425, 435, 445 and 455 to be of a different size than at least one other of control blocks 415, 425, 435, 445 and 455.

In some embodiments, each of control blocks 415, 425, 435, 445 and 455 may share some identical members, such as a pointer to a respective page, but no two control blocks 415, 425, 435, 445 and 455 include identical sets of members. According to some examples, control block 415 for page 410 having a columnar resource type includes a vector member, while control block 425 for page 420 having a row-based resource type does not include a vector member. Control block 445 for page 440 having a resource type of "converter inner page" may include an array of pointers to one or more child converter pages and a pointer to a control block of a parent converter inner page, while control blocks 415 and 425 for pages 440 may include a pointer to a control block of a converter leaf page.

Embodiments are not limited to the foregoing resource types or to the members described above.

Figure 5:
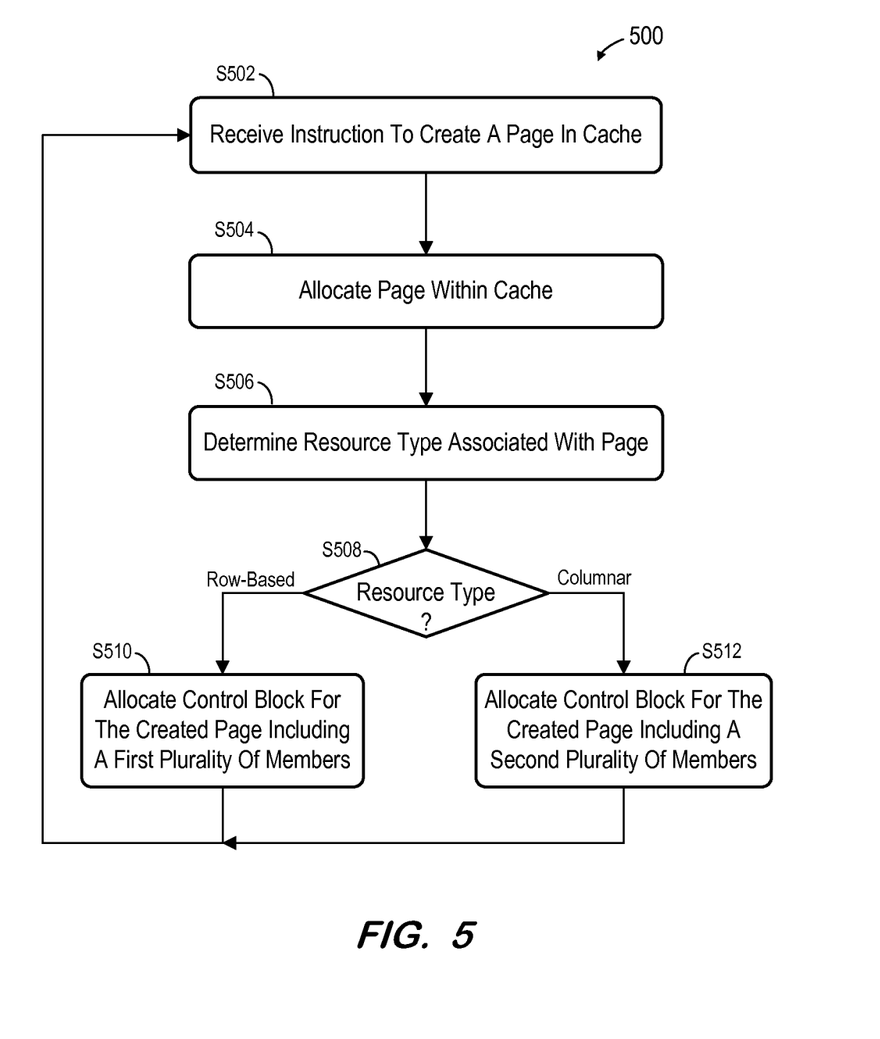
FIG. 5 comprises a flow diagram of a process according to some embodiments.

FIG. 5 comprises a flow diagram of process 500 according to some embodiments. In some embodiments, various hardware elements of a database execute program code to perform process 500. Process 500 may be performed by data access manager 114 of DB server process 110 according to some embodiments.

Process 500 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S502, an instruction is received to create a page in a cache. The instruction may comprise an instruction to load a converter from a datastore into a cache, an instruction to load a page into the cache for which access has been requested, or any other instruction. Next, at S504, the page is allocated within the cache. S504 may comprise allocating a memory area of the cache to the page, and preparing a hash entry such that the memory area may be located based on a reference to the page.

A resource type associated with the page is determined at S506. FIG. 4 provides five examples of resource types, but embodiments are not limited thereto. At S508, flow is directed based on the determined resource type. Process 500 shows two options for flow direction, but again embodiments are not limited thereto.

According to process 500, a control block is allocated for the created page within the cache at S510 if the resource type is "row-based". The control block allocated at S510 includes a first plurality of members. Alternatively, a control block is allocated for the created page within the cache at S512 if the resource type is "columnar". The control block allocated at S512 includes a second plurality of members which are different from the first plurality of members. Due to the differences in their members, a control block allocated at S510 may be of a different size than a control block allocated at S512.

By virtue of some embodiments of the foregoing, control blocks for cached pages may include information specific to the particular resource types of the cached pages. The information may enable optimizations and code simplifications related to the management of the cached pages while reducing demand on the cache resources, since it is not necessary to include members useful for one resource type in the control blocks of other resource types.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A method for a database system, comprising:
   receiving an instruction to load a page from a database datastore into a database cache;
   allocating the page within the cache;
   after the receiving of the instruction to load the page from the database datastore into the database cache, associating the page in the database cache with a resource type and determining the resource type associated with the page; and
   after the determining of the resource type associated with the page, allocating a control block for the page within the cache based on the determined resource type,
   wherein the allocated control block in a case that the resource type is a first resource type is different from the allocated control block in a case that the resource type is a second resource type; and wherein the allocating a control block for the page within the cache based on the determined resource type comprises:

allocating a control block that is for the page and includes information that is:

used for cache management.

2. A method according to claim 1, wherein if the resource type is the first resource type, the allocated control block for the page within the cache comprises a first plurality of data members, wherein if the resource type is the second resource type, the allocated control block for the page within the cache comprises a second plurality of data members, and wherein the first plurality of data members is not identical to the second plurality of data members.

3. A method according to claim 1, wherein a size of the allocated control block if the resource type is the first resource type is different than a size of the allocated control block if the resource type is the second resource type.

4. A method according to claim 1, wherein the allocated control block in a case that the resource type is a third resource type is different from the allocated control block in a case that the resource type is the first resource type or the second resource type.

5. A method according to claim 1, wherein the allocated control block comprises a vector member if the determined resource type is columnar and does not comprise a vector member if the determined resource type is row-based.

6. A method according to claim 1, wherein the allocated control block comprises an array of pointers to control blocks of one or more child converter pages and a pointer to a control block of a parent converter page if the determined resource type is a converter inner page.

7. A method according to claim 1, wherein the allocated control block comprises a pointer to a control block of a converter leaf page if the determined resource type is a data page.

8. A non-transitory computer-readable medium storing program code, the program code executable by a computer, the program code comprising:

code to receive an instruction to load a page from a database datastore into a database cache;

code to allocate the page within the cache;

code to, after receiving the instruction to load the page from the database datastore into the database cache, associate the page in the database cache with a resource type and determine the resource type associated with the page; and code to, after determining the resource type associated with the page, allocate a control block for the page within the cache based on the determined resource type, wherein the allocated control block in a case that the resource type is a first resource type is different from the allocated control block in a case that the resource type is a second resource type; and wherein the allocate a control block for the page within the cache based on the determined resource type comprises:

allocate a control block that is for the page and includes information that is: used for cache management.

9. A medium according to claim 8, wherein if the resource type is the first resource type, the allocated control block for the page within the cache comprises a first plurality of data members, wherein if the resource type is the second resource type, the allocated control block for the page within the cache comprises a second plurality of data members, and wherein the first plurality of data members is not identical to the second plurality of data members.

10. A medium according to claim 9, wherein a size of the allocated control block if the resource type is the first resource type is different than a size of the allocated control block if the resource type is the second resource type.

11. A medium according to claim 8, wherein the allocated control block in a case that the resource type is a third resource type is different from the allocated control block in a case that the resource type is the first resource type or the second resource type.

12. A medium according to claim 8, wherein the allocated control block comprises a vector member if the determined resource type is columnar and does not comprise a vector member if the determined resource type is row-based.

13. A medium according to claim 8, wherein the allocated control block comprises an array of pointers to control blocks of one or more child converter pages and a pointer to a control block of a parent converter page if the determined resource type is a converter inner page.

14. A medium according to claim 8, wherein the allocated control block comprises a pointer to a control block of a converter leaf page if the determined resource type is a data page.

15. A system comprising:

a datastore storing a plurality of converter pages and a plurality of data pages;

a database cache;

a memory storing processor-executable process steps; and a processor to execute the processor-executable process steps to cause the system to:

receive an instruction to load a page from the datastore into the cache;

allocate the page within the cache;

after receiving the instruction to load the page from the database datastore into the database cache, associate the page in the database cache with a resource type and determine the resource type associated with the page; and after determining the resource type associated with the page, allocate a control block for the page within the cache based on the determined resource type, wherein the allocated control block in a case that the resource type is a first resource type is different from the allocated control block in a case that the resource type is a second resource type; and wherein the allocate a control block for the page within the cache based on the determined resource type comprises:

allocate a control block that is for the page and includes information that is: used for cache management.

16. A system according to claim 15, wherein if the resource type is the first resource type, the allocated control block for the page within the cache comprises a first plurality of data members, wherein if the resource type is the second resource type, the allocated control block for the page within the cache comprises a second plurality of data members, and wherein the first plurality of data members is not identical to the second plurality of data members.

17. A system according to claim 16, wherein a size of the allocated control block if the resource type is the first resource type is different than a size of the allocated control block if the resource type is the second resource type.

18. A system according to claim 15, wherein the allocated control block in a case that the resource type is a third resource type is different from the allocated control block in a case that the resource type is the first resource type or the second resource type.

19. A system according to claim 15, wherein the allocated control block comprises a vector member if the determined resource type is columnar and does not comprise a vector member if the determined resource type is row-based.

20. A system according to claim 15, wherein the allocated control block comprises an array of pointers to control blocks of one or more child converter pages and a pointer to a control block of a parent converter page if the determined resource type is a converter inner page.

21. A system according to claim 15, wherein the allocated control block comprises a pointer to a control block of a converter leaf page if the determined resource type is a data page.

22. A method according to claim 1, wherein the control block for the page is allocated within the cache when the page is allocated within the cache.

23. A method according to claim 1, wherein the page allocated within the cache stores a type of data; and
wherein the determining a resource type associated with the page comprises:
determining a resource type that refers to the type of data stored in the page allocated within the cache.

24. A method according to claim 1, wherein the control block for the page allocated within the cache in a case that the resource type associated with the page allocated within the cache is a first resource type includes information that is specific to the first resource type associated with the page allocated within the cache; and
wherein the control block for the page allocated within the cache in a case that the resource type associated with the page allocated within the cache is a second resource type includes information that is specific to the second resource type associated with the page allocated within the cache.

25. A method according to claim 1, wherein the control block for the page allocated within the cache in a case that the resource type associated with the page allocated within the cache is a first resource type includes information that is specific to the first resource type associated with the page allocated within the cache; and
wherein the control block for the page allocated within the cache in a case that the resource type associated with the page allocated within the cache is a second resource type includes information that is: (i) specific to the second resource type associated with the page allocated within the cache and (ii) different than the information that is included in the control block for the page allocated within the cache in the case that the resource type associated with the page allocated within the cache is the first resource type.

26. A method according to claim 22, wherein the page allocated within the cache stores a type of data; and
wherein the determining a resource type associated with the page comprises:
determining a resource type that refers to the type of data stored in the page allocated within the cache.

27. A method according to claim 26, wherein in a case that the resource type associated with the page allocated within the cache is a first resource type, the control block that is allocated within the cache when the page is allocated within the cache includes information that is specific to the first resource type associated with the page allocated within the cache; and
wherein in a case that the resource type associated with the page allocated within the cache is a second resource type, the control block that is allocated within the cache when the page is allocated within the cache includes information that is specific to the second resource type associated with the page allocated within the cache.

28. A method according to claim 26, wherein in a case that the resource type associated with the page allocated within the cache is a first resource type, the control block that is allocated within the cache when the page is allocated within the cache includes information that is specific to the first resource type associated with the page allocated within the cache; and
wherein in a case that the resource type associated with the page allocated within the cache is a second resource type, the control block that is allocated within the cache when the page is allocated within the cache includes information that is: (i) specific to the second resource type associated with the page allocated within the cache and (ii) different than the information that is included in the control block for the page allocated within the cache in the case that the resource type associated with the page allocated within the cache is the first resource type.

29. A method for a database system, comprising:
receiving an instruction to load a page from a database datastore into a database cache;
allocating the page within the cache;
associating the page in the database cache with a resource type;
determining a resource type associated with the page; and
allocating a control block for the page within the cache based on the determined resource type,
wherein the allocated control block in a case that the resource type is a first resource type is different from the allocated control block in a case that the resource type is a second resource type; and
wherein the allocated control block includes at least one of: (i) a read/write lock for the contents of the page, (ii) an I/O lock and (iii) an in memory lock flag.

30. A method according to claim 29, wherein the allocated control block includes a read/write lock for the contents of the page.

31. A method according to claim 29, wherein the allocated control block includes a flag indicating whether or not the page has been modified.

32. A method according to claim 29, wherein the allocated control block includes least recently used information used to implement page replacement policies for freeing cache space.

33. A method according to claim 29, wherein the allocated control block includes a read/write lock for the contents of the page, a flag indicating whether or not the page has been modified and least recently used information used to implement page replacement policies for freeing cache space.

34. A method according to claim 29, wherein the allocated control block includes an I/O lock.

35. A method according to claim 29, wherein the allocated control block includes an in memory lock flag.

36. A method according to claim 1, wherein the allocated control block includes least recently used information used to implement page replacement policies for freeing cache space.

* * * * *